US008140003B2

(12) United States Patent  
Laroia et al.

(10) Patent No.: US 8,140,003 B2  
(45) Date of Patent: Mar. 20, 2012

(54) METHOD AND APPARATUS FOR SUPPORTING MULTI-HOP COMMUNICATIONS IN A PEER TO PEER COMMUNICATION SYSTEM

(75) Inventors: Rajiv Laroia, Far Hills, NJ (US); Thomas Richardson, South Orange, NJ (US); Junyi Li, Bedminster, NJ (US); Xinzhou Wu, Monmouth Junction, NJ (US); Saurabh Tavildar, Jersey City, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 909 days.

(21) Appl. No.: 12/178,231

(22) Filed: Jul. 23, 2008

(65) Prior Publication Data

US 2010/0022190 A1    Jan. 28, 2010

(51) Int. Cl.
H04B 7/15 (2006.01)
(52) U.S. Cl. ....... 455/11.1; 455/67.11; 455/7; 455/13.1; 455/115.1; 370/254; 370/400; 370/328
(58) Field of Classification Search ............ 455/11.1, 455/7, 9, 13.1, 513, 41.2, 67.11, 67.13, 423, 455/418; 370/238, 332, 395.42, 278, 328, 370/337, 229, 395.21, 252, 389, 395.2, 254, 370/400
See application file for complete search history.

(56) References Cited

U.S. PATENT DOCUMENTS 7,159,111 B1 * 1/2007 Ganapathy .................... 713/167

(Continued)

FOREIGN PATENT DOCUMENTS

WO    WO03055246 A1    7/2003
WO    WO2006043902 A1    4/2006

OTHER PUBLICATIONS

Hao Zhu et al: "gamma DCF: A relay-enabled medium access control protocol for wireless ad hoc networks" INFOCOM 2005. 24th Annual Joint Conference of the IEEE Computer and Co mmunications Societies. Proceedings IEEE Miami, FL, USA Mar. 13-17, 2005, Piscataway, NJ, USA, IEEE, Piscataway, NJ, USA, vol. 1, Mar. 13, 2005, pp. 12-22, XP010829047 ISBN: 978-0-7803-8968-7 p. 13, chapter "I I . Background and Related Work" p. 14, chapter p. 14, chapter DCF figures 1,2.

(Continued)

*Primary Examiner* — Tan Trinh
(74) *Attorney, Agent, or Firm* — James K. O'Hare

(57) ABSTRACT

Methods and apparatus for wireless communications in networks, e.g., regional ad hoc peer to peer networks, are described. A communications node, e.g., a third node monitors for wireless communications between other peer communication nodes, e.g., a first node and a second node, in its local vicinity. The third node determines from the monitored wireless communication an indication of link quality corresponding to a communication link between the communication nodes which are communicating or seeking to establish a communications link. The third node generates an estimate of a link quality for a communications link between itself and the first node. Based on the indication of link quality and generated estimate of link quality, the third node decides whether or not to send a signal indicating availability to relay communication between the first and second nodes. The third node, when acting as an intermediary node after indicating its availability to so act, may receive traffic data e.g., user data communicated in a peer to peer traffic segment, from the first node. The third node communicates the received traffic data to the second node by transmitting the traffic data.

22 Claims, 4 Drawing Sheets

U.S. PATENT DOCUMENTS

| | | | |
|---|---|---|---|
| 7,366,110 B2* | 4/2008 | Gillespie et al. | 370/254 |
| 7,924,749 B2* | 4/2011 | Ren et al. | 370/278 |
| 2003/0179756 A1* | 9/2003 | Cain | 370/395.42 |
| 2003/0214914 A1* | 11/2003 | Cain | 370/252 |
| 2006/0039371 A1* | 2/2006 | Castro et al. | 370/389 |
| 2006/0064484 A1* | 3/2006 | Fawcus | 709/224 |
| 2006/0067274 A1* | 3/2006 | Gillespie et al. | 370/331 |
| 2007/0077926 A1* | 4/2007 | Manjeshwar et al. | 455/423 |
| 2007/0127372 A1* | 6/2007 | Khan et al. | 370/229 |
| 2008/0144578 A1* | 6/2008 | Kaal | 370/331 |
| 2008/0148244 A1* | 6/2008 | Tannenbaum et al. | 717/136 |
| 2008/0267141 A1* | 10/2008 | Ren et al. | 370/337 |
| 2008/0298250 A1* | 12/2008 | Larsson | 370/238 |
| 2009/0322518 A1* | 12/2009 | Liang et al. | 340/539.18 |
| 2010/0008302 A1* | 1/2010 | Sayers et al. | 370/328 |

OTHER PUBLICATIONS

International Search Report & Written Opinion—PCT/US2009/051384, International Search Authority—European Patent Office—Sep. 21, 2009.

Warabino T et al: "Adaptive Media Switching for Future Vehicle-to-Vehicle Communication" Personal, Indoor and Mobile Radio Communications, 2005. PIMRC 2005. IE EE 16th International Symposium on Berlin, Germany Sep. 11-14, 2005, Piscataway, NJ, USA,IEEE, vol. 2, Sep. 11, 2005, pp. 795-800, XP010926405 ISBN: 978-978-38007-2-4 p. 795.

chapter "II. Media Selecting Methods" p. 797, chapter "III. Adaptive Media. Switching" figures 1-7.

* cited by examiner

METHOD AND APPARATUS FOR SUPPORTING MULTI-HOP COMMUNICATIONS IN A PEER TO PEER COMMUNICATION SYSTEM

FIELD

Various embodiments relate to wireless communications methods and apparatus and, more particularly, to wireless communications methods and apparatus which support multi-hop communications via an intermediary node.

BACKGROUND

In a peer to peer network, different nodes present in the system may communicate traffic data from one peer to the other in a communications session. The traffic data may be communicated using a communication link between the nodes which has an associated link quality depending on a plurality of factors including, for example, interference level, channel path gain, channel path loss, etc. In such a system, one problem that is often encountered is that the communication link between the two communicating nodes which are far apart, may have a poor link quality. A poor link quality may cause the problems in the transmitted traffic data, may require the use of high transmission power levels and/or low traffic rates. Thus, a poor link between two peers may make it difficult for peers to communicate data reliably and/or at sufficiently high data rates. Use of high transmission power not only creates interference to other devices but can result in battery drain due to the use of high power levels.

While communication through an intermediate node may be permitted in some systems, it may be difficult to detect the presence of a suitable intermediate node particularly in an ad hoc network and/or it may be difficult to determine if using an intermediate node will be beneficial as compared to directly communicating with a peer device.

Thus, it should be appreciated that there is a need for methods of facilitating communications between peer devices which would allow for the use of, e.g., reduced transmission power levels, support increased transmission data rates and/or provide increased communication reliability. In addition it should be appreciated that there is a need for improved methods of detecting the presence of a device which may be used as intermediate node to facilitate communication and/or of improved methods of determining if communication through an intermediate node would be beneficial or desirable could be developed.

SUMMARY

Methods and apparatus for wireless communications in networks, e.g., regional ad hoc peer to peer networks, are described. A communications node, e.g., a third node monitors for wireless communications between other peer communication nodes, e.g., a first node and a second node, in its local vicinity. The third node determines from the monitored wireless communication an indication of link quality corresponding to a communication link between the communication nodes which are communicating or seeking to establish a communications link. The third node generates an estimate of a link quality for a communications link between itself and the first node. Based on the indication of link quality and generated estimate of link quality, the third node decides whether or not to send a signal indicating availability to relay communication between the first and second nodes. The third node, when acting as an intermediary node after indicating its availability to so act, may receive traffic data e.g., user data communicated in a peer to peer traffic segment, from the first node. The third node communicates the received traffic data to the second node by transmitting the traffic data.

In some embodiments, monitoring wireless communications between the first and second nodes includes receiving a wireless signal transmitted by one of the first and second nodes to the other one of the first and second nodes. In some embodiments, the third node determines from the monitored wireless communications, an indication of a communications link quality corresponding to a communications link between the first and the second node. In some other embodiments, the third node generates an estimate of link quality for a wireless communications link between the first node and the third node. For example, the third node may monitor and detect wireless communications between the first and second node and measures the received power of a signal, e.g., peer discovery signal, transmitted from the first node at a predetermined known power level. In one such embodiment the third node determines, e.g., one of a channel path gain and a channel path loss from the first node to the third node based on the measured received power.

After determining an indication of link quality between the first and second node and generating the estimate of link quality between the first and third node, the third node decides, in some embodiments, whether or not send a signal, e.g., a signal indicating availability to relay communications between the first and the second nodes through the third node. In some embodiments, the decision to send such a signal is based on the determined indication of link quality and generated estimate of link quality. For example, the determination of the indication of link quality may show that the communications link between the first and second node is of a poor quality while the generated estimate of link quality may suggest that the communications link between the first and third node is of good quality, e.g., the link quality of the communications link between the first and third node meets or exceeds a predetermined criterion set for evaluating link quality. Under such conditions, e.g., where the link between the first and third nodes is good and better then the link between the direct link between the first and second nodes, in some embodiments, the third node may decide to send a signal indicating availability to relay communications between the first and the second nodes.

If the third node decides that a signal indicating availability to relay communications between the first and the second nodes through the third node should be sent, then the third node transmits such a signal to at least one of the first and second nodes. In some embodiments, the signal indicating availability to relay communications is an instruction to perform communications through the third node. Alternatively, in some other embodiments, the signal indicating availability to relay communications simply indicates that the third node is available as a relay, for selection by one of the first and second nodes. In some embodiments, a decision may be made by, e.g., one of the first and second nodes, to use the third node as a relay in communicating data to the other one of the first and second nodes. Following such a decision traffic data may, and sometimes is, communicated indirectly between the two devices, i.e., between the first and second nodes. In some embodiments, the first node transmits traffic data, directed to the second node, to the third node which is acting as an intermediary or hop point in the data routing.

In some embodiments, the third node receives a first traffic signal from the first node communicating traffic data to the second node. The third node then transmits a second traffic signal communicating the traffic data sent by the first node, to the second node. In some embodiments, the third node performs processing on the first traffic signal to recover the communicated traffic data, e.g., performs a data decoding operation on the first traffic signal. In some such embodiments, after recovering the traffic data, the third node performs an encoding operation to generate an encoded version of the recovered communicated traffic data. The encoded version of the recovered communicated traffic data is included in a second traffic signal and is transmitted from the third node to the second node.

An exemplary method of operating a third node to facilitate communication between a first and second node, comprises: monitoring wireless communication between the first and second node; determining from the monitored wireless communication, an indication of link quality corresponding to a communications link between the first and second nodes; generating an estimate of link quality for a wireless communications link between the first node and said third node; and deciding based on the indication of link quality and the generated estimate of link quality whether to send a signal to at least one of the first and second nodes.

An exemplary third node, in accordance with some embodiments, comprises: a monitoring module configured to monitor wireless communication between a first node and a second node; a link quality indication determination module configured to determine from the monitored wireless communication, an indication of link quality corresponding to a communications link between the first and second nodes; a link quality estimate generation module configured to generate an estimate of link quality for a wireless communications link between the first node and said third node; and a decision module configured to decide based on the indication of link quality and the generated estimate of link quality whether to send a signal to at least one of the first and second nodes. In one example, the first node and the second node are in a region including the third node, e.g., the first, second and third nodes are located in the same region and are part of an ad-hoc peer to peer communications network. In some embodiments, the first and second nodes are mobile wireless terminals, and the third node is a stationary device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
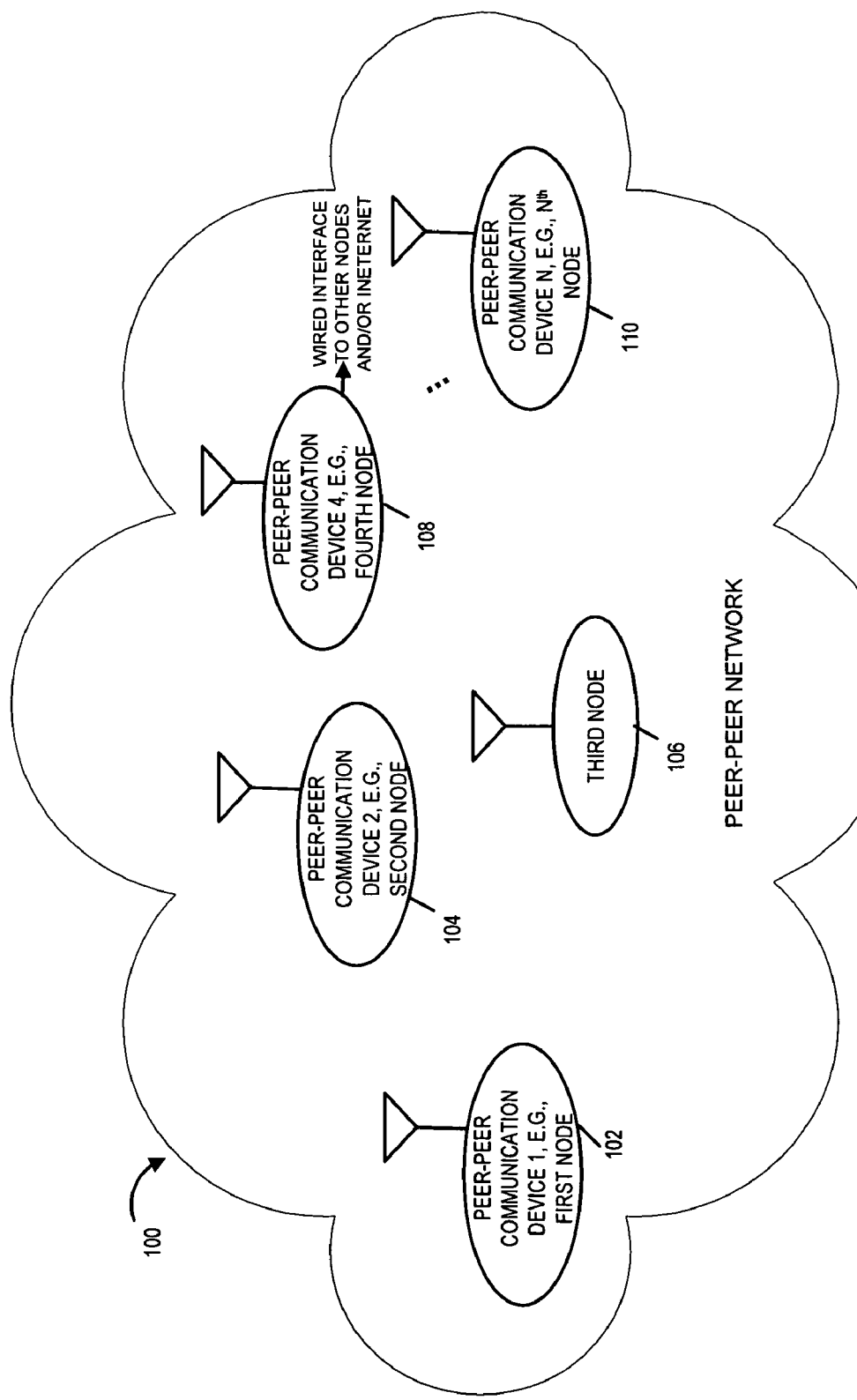
FIG. 1 is a drawing of an exemplary peer to peer communications network, e.g., an ad-hoc peer to peer communications network in a local region, in accordance with one exemplary embodiment.

FIG. 1 is a drawing of an exemplary peer to peer communications network 100 e.g., an ad-hoc peer to peer communications network implemented in a local region, in accordance with one exemplary embodiment. Exemplary communications network 100 includes a plurality of peer to peer wireless communications devices (first node 102, second node 104, fourth node 108, . . . , Nth node 110) and a third node 106, e.g., a stationary device. The wireless communications devices (102, 104, 108, . . . , 110) support various signaling between peers, e.g., peer discovery signals, transmission request signals etc., and data transmissions between peers with Routing of communications between peer devices which may, and sometimes does include multiple hops. In accordance with an exemplary embodiment, a first peer to peer device, e.g., the first node 102 discovers another peer to peer device, e.g., the second node 104 in its local vicinity, yet the first node 102 may, and sometimes does, send data, e.g., user data in a peer to peer traffic segment to the second node 104 via an intermediary, e.g., a third node which acts as a hop point in the data routing. Some of the peer to peer communications devices, e.g., device 4 108, also include a wired interface, which couples the peer to peer communications device to other nodes and/or the Internet, in addition to a wireless communications interface. Some of the peer to peer communications devices are mobile communications devices, e.g., handheld mobile communications devices.

Figure 2:
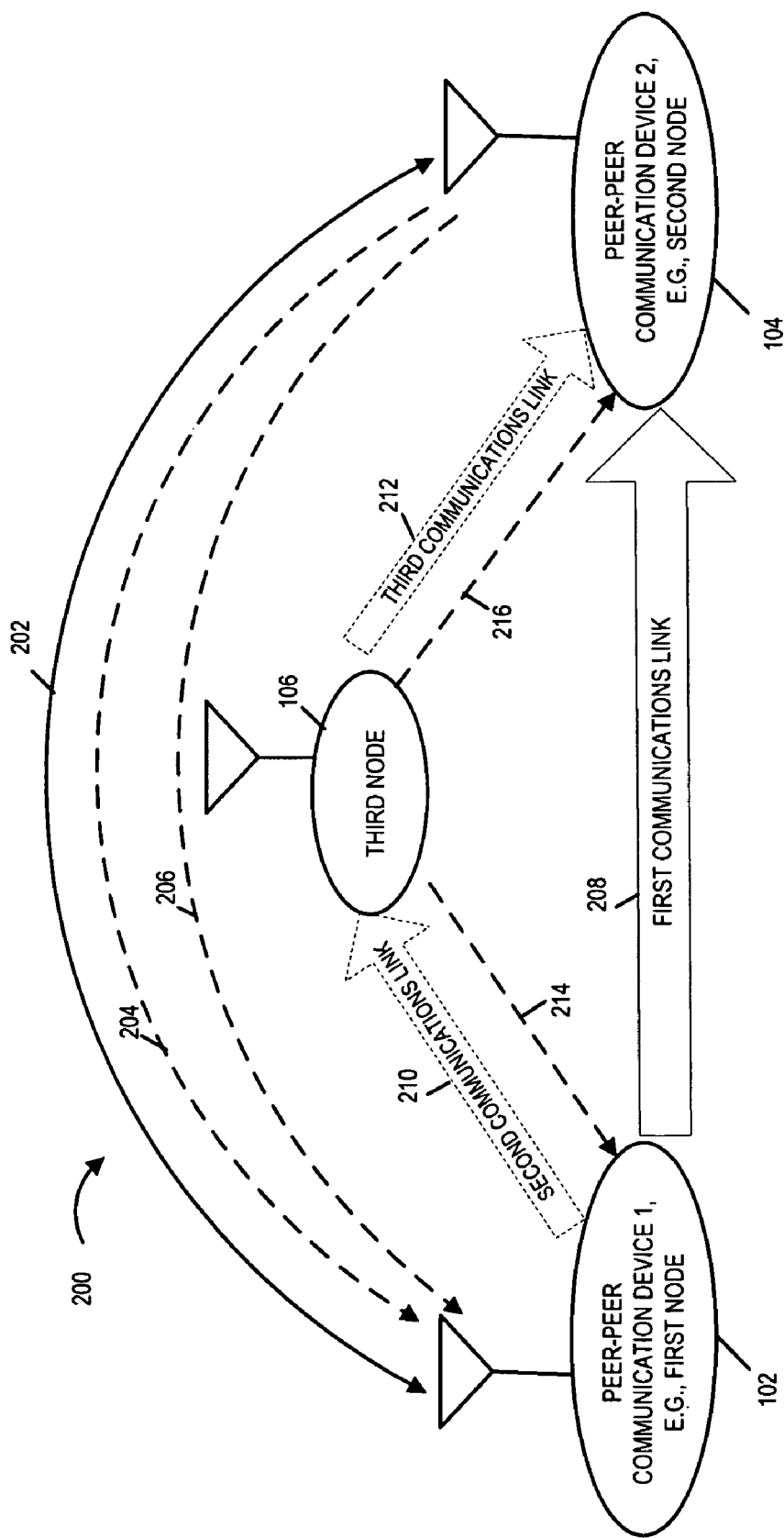
FIG. 2 is a detailed illustration of a portion of the peer to peer wireless communication network of FIG. 1 featuring the first, second and third nodes showing the signaling exchange between the devices in greater detail, in accordance with an exemplary embodiment.

FIG. 2 illustrates a portion 200 of the exemplary peer to peer communications network 100. The portion 200 includes the first node 102, the second node 104 and the third node 106. The various nodes in the communications network are, e.g., mobile nodes supporting peer to peer communications, in accordance with an exemplary embodiment. Thus, the first, second and third nodes maybe mobile nodes. However, in some embodiments, the first and second nodes 102, 104 are mobile while the third node 106, e.g., an intermediary node is a stationary device.

As shown in FIG. 2, the third node 106 monitors wireless communication between the first node 102 and the second node 104. The communication can be in either direction. The wireless communications between the first and second node are indicated in FIG. 2 by the arrow 202. In some embodiments, monitoring wireless communication between the first and second nodes includes receiving a wireless signal transmitted by one of the first and second node to the other one of the first and second node. In some embodiments, the monitored wireless communication is a traffic data rate indicator signal communicated from the second node 104 to the first node 102 as indicated in the figure by arrow 204. In some other embodiments, the monitored wireless communication is a link quality indicator signal communicated from the second node 104 to the first node 102 as indicated in FIG. 2 by arrow 206.

To facilitate better understanding of the role played by the third node, e.g., the intermediary node in establishing communications between the first and second nodes 102, 104, lets consider an example. In accordance with an exemplary embodiment, the first node 102 sends a signal, e.g., a pilot signal to the second node at some power level. The second node 104 receives the pilot signal, processes the received pilot signal, e.g., performs analysis of the received power level and generates a data rate indicator signal, indicative of a data rate which can be supported. The second node 104 then respond to the first node by communicating a rate echo signal 204, i.e., a traffic data rate indicator signal. For the purpose of this example and in accordance with one exemplary embodiment, we assume that the third node 106 is configured to monitor for the rate echo signals being communicated from one peer device (e.g., second node 104) to the other peer device (e.g., first node 102). Thus, the third node detects the rate echo signal 204 and in some embodiments, processes the signal 204 in order to recover an indicated traffic data rate from the rate echo signal 204. It should be noted that the terms rate echo signal and traffic data rate indicator signal have been interchangeably used in this application. The indicated traffic data rate recovered by the third node 106 provides the third node with an indication of the quality of the first communication link 208 between the first and second node. Thus the third node is able to determine the link quality from the indicated traffic data rate.

In accordance with an exemplary embodiment, the third node predicts a link quality, e.g., quality of a second communication link 210 between the first node and the third node, and/or quality of a third communication link 212 between the third node and the second node based on a received signal. The third node generates an estimate of a link quality for a wireless communication link, e.g., a possible communication link to route the traffic data between the first node and the second node, in either direction, through the third node. For the purpose of the example of FIG. 2, we assume that the third node generates an estimate of link quality for a wireless communication link between the first and third node. In some embodiments, in addition to determining an indication of link quality corresponding to a communication link between the first and second nodes 102, 104 the third node generates an estimate of link quality for a wireless communication link between the first and third nodes 102, 106, e.g., the second communication link 210 and also an estimate of the link quality of a link 212 between the third and second nodes 106, 104. The third node 106 may decide based on some predetermined logic as will be discussed later, whether or not the third node 106 should offer help in establishing communications between the first and second nodes 102, 104. For example, in some embodiments, based on the indication of link quality and the generated estimate of link quality the third node 106 may decide that quality of the communications link, e.g., the first communication link 208 is poor and the predicted or estimated quality of link(s) 210 and 212 is better. In such a case the third node may offer help, e.g., to act as a hop-point in routing traffic data between the first and second node. In such embodiments where the third node offers to assist in the communication between the first and second nodes, the third node sends a signal to at least one of the first and second nodes, indicating availability of the third node 106 to relay communications between the first node 102 and the second node 104.

It should be appreciated that the control or authority to use the third node as a relay, could be with any of the first, second or third node depending on the system/network design. In some embodiments, the third node 106 controls whether or not, the traffic data being communicated from the first node 102 to the second node 104 will be routed through the third node. In such embodiments, the signal, e.g., signal 214 or 216, transmitted by the third node 106 to one of the first and second nodes 102, 104, is an instruction to perform communication through the third node 106. Alternatively, in some other embodiments, the control of whether or not to accept the help offered by the third node to relay communications between the first and second nodes through the third node 106 may lie, e.g., with either one of the first and second nodes 102, 104. In such embodiments, the signal, e.g., signal 214 or 216, transmitted by the third node 106 to one of the first and second nodes, is simply an indication that the third node is available, for selection by one of the first and second nodes 102, 104, as a relay. Although the operation of the third node 106 is discussed using the example of first and second node 102, 104, however it should be appreciated that the third node 106 may, and sometimes does monitor for wireless communication between a plurality of nodes in the vicinity. In some embodiments the third node 106 may decide, based on various factors, e.g., comparison of link quality corresponding to communication links being used, as to which of the nodes should be sent an availability signal.

Figure 3:
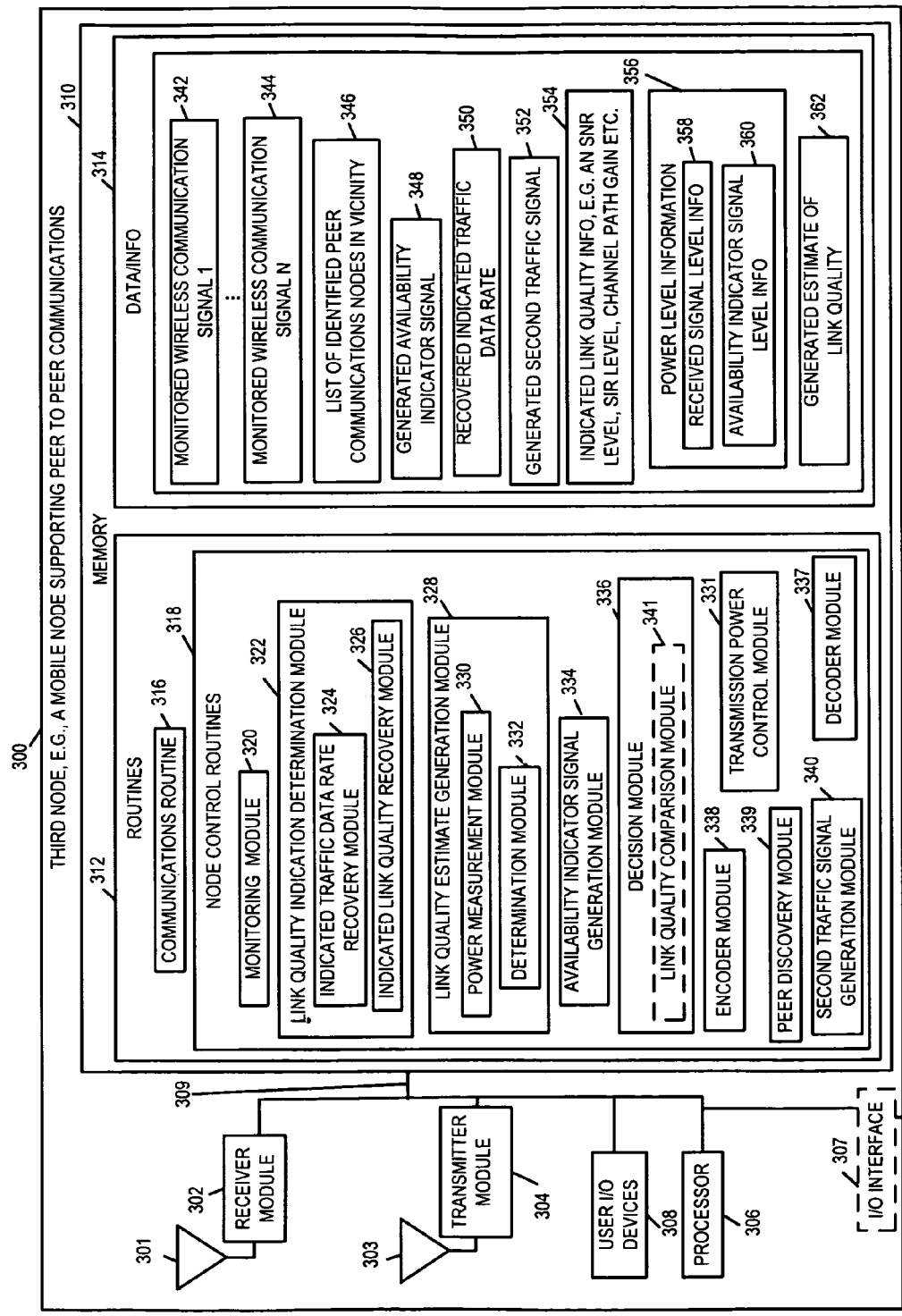
FIG. 3 is a drawing illustrating an exemplary third node, e.g., an intermediary node for facilitating communication between the first and second, in accordance with one exemplary embodiment.

FIG. 3 is a drawing of an exemplary communications node 300, e.g., an intermediary node supporting peer to peer communications, which may be implemented as the third node 106 of FIG. 1, in accordance with an exemplary embodiment.

Exemplary third node 300 includes wireless receiver module 302, wireless transmitter module 304, a processor 306, user I/O devices 308, and memory 310 coupled together via a bus 309 over which the various elements may interchange data and information. In some embodiments, the third node is a stationary device. In some embodiments, e.g., where the third node 300 is a stationary device, the third node 300 also includes an I/O interface 307 coupled to bus 309. The I/O interface 307 maybe a wired interface, via which communications device 300 may be coupled to a backhaul network including other network nodes, a cellular network, and/or the Internet.

Memory 310 includes routines 312 and data/information 314. The processor 306, e.g., a CPU, executes the routines 312. Using the data/information 314 in memory 310, the processor 306 under the control of one or more routines, controls the third node 300 to implement methods, e.g., a method in accordance with flowchart 400 of FIG. 4.

Routines 312 include a communications routine 316 and a set of node control routines 318. The communications routine 316 implements the various communications protocols used by the third node 300. The node control routines 318 include a monitoring module 320, a link quality indication determination module 322, a link quality estimate generation module 328, an availability indicator signal generation module 334, a decision module 336, a decoder module 337, an encoder module 338, a second traffic data signal generation module 340, transmission power control module 331, peer discovery module 339, and a decision module 336. The decision module 336 includes a link quality comparison module 341. The link quality indication determination module 322 includes an indicated traffic data rate recovery module 324 and an indicated link quality recovery module 326. The link quality estimate generation module 328 includes a power measurement module 330 and a determination module 332.

Data/information 314 includes monitored wireless communication signals (monitored wireless communication signal 1 342 e.g., a traffic data rate indicator signal, . . . , monitored wireless communication signal N 344 e.g., a link quality indicator signal), a maintained list of identified peer communications nodes in the vicinity 346, a generated availability indicator signal 348, recovered indicated traffic data rate value 350, a generated second traffic signal 352, indicated link quality information 354, generated estimate of link quality 362 and power level information 356. The power level information 356 includes received wireless signal level information 358, and availability indicator signal level information 360.

Wireless receiver module 302 which maybe, e.g., an OFDM receiver, is coupled to receive antenna 301 via which the third node 300 receives signals from other communications nodes in the region. Received signals include signals received as part of monitored wireless communications between other peer nodes in the region. The monitored signals maybe, e.g., data rate indicator signals, link quality indicator signals etc. Thus during operation wireless receiver module 302 may receive wireless communication signals including, e.g., a wireless signal transmitted by one of the first and second nodes to the other one of the first and second nodes. The wireless receiver module 302 is further configured to receive a first traffic signal from the first node communicating traffic data to be communicated to the second node. The first and second nodes are, e.g., peer communications devices seeking to establish communications.

Wireless transmitter module 304 maybe, e.g., an OFDM transmitter. The transmitter 304 is coupled to transmit antenna 303 via which the third node 300 transmits signals to other communications nodes in the region. In some embodiments, the same antenna is used for the receiver and the transmitter rather than separate antennas 301, 303. During the operation, the wireless transmitter module 304 may, and sometimes is, configured to transmit a signal indicating availability, e.g., availability indicator signal generated by the module 334, to relay communications between the first and second nodes 102, 104 through the third node 106 when it is decided by said decision module 336 to send a signal to at least one of the first and second nodes 102, 104. In some embodiments, the signal indicating availability to relay communication is an instruction to perform communication through the third node 106. In some embodiments, the signal indicating availability to relay communication indicates that the third node 106 is available for selection by one of said first and second nodes 102, 104, as a relay. The wireless transmitter module 304 is further configured, at various points in time, to transmit a second traffic signal from the third node 106 to the second node 104, the second traffic signal communicating the traffic data communicated by the first traffic signal. The data may include user data, e.g., peer to peer traffic data conveying text, audio, and/or image data.

Monitoring module 320 is for monitoring the wireless communication between the peer communication devices, e.g., the first node and the second node 102, 104. Amongst various signals received by the third node 106, the monitoring module 320 assists the third node to monitor for wireless communication between the first and second nodes 102, 104. For example the monitoring module 320 monitors for a received wireless signal transmitted by one of the first and second nodes 102, 104 to the other one of the first and second nodes 102, 104. In some embodiments, the monitored wireless communication between the first and second node 102, 104 is a traffic data rate indicator signal communicated from the second node to the first node. In some embodiments, the monitored wireless communication between the first and second nodes 102, 104 is a link quality indicator signal communicated from the second node 104 to the first node 102.

Link quality indication determination module 322 is for determining from the monitored wireless communication, an indication of link quality corresponding to a communications link between the first and second nodes 102, 104. The link quality indication determination module 322 includes an indicated traffic data rate recovery module 324 and an indicated link quality recovery module 326. As discussed above, in some embodiments the monitored wireless communication between the first and second node 102, 104 is a traffic data rate indicator signal. The indicated traffic data rate recovery module 324 is configured to process such a traffic data rate indicator signal to derive an indicated traffic data rate from the signal. This may involve decoding the received signal or otherwise recovering the rate information from the received signal. The indicated data rate is an indication of link quality since better links normally support higher data rates than lower quality links. In some embodiments, the monitored wireless communication between the first and second node is a link quality indicator signal. The indicated link quality recovery module 326 is configured to process such a link quality indicator signal and recover an indicated link quality corresponding to a communication link between the first and second nodes.

Link quality estimate generation module 328 is for determining and generating an estimate of link quality for a wireless communications link between the first node 102 and said third node 106. As discussed earlier in the example of FIG. 2, the third node 106 is capable of predicting a link quality, e.g., quality of a second communication link 210 between the first node 102 and the third node 106. This capability/function is provided by the link quality estimate generation module 328. The link quality estimate generation module 328 generates an estimate of a link quality for a wireless communication link, e.g., a possible communication link which can be used to route the traffic data between the first node 102 and the second node 104, via the third node 106. The link quality estimate generation module 328 includes a power measurement module 330 to measure the received power of a signal, (e.g., a broadcast discovery signal, pilot signal etc., transmitted at a predetermined known power level) transmitted from the first node at a known power level. The link quality estimate generation module 328 further includes a determination module 332 configured to determine one of a channel path gain and a channel path loss from the first node to the third node based on the measured received power by the power measurement module 330. The determined channel path gain and/or channel path loss correspond to, e.g., a channel between the first and third nodes 102, 106.

Transmission power control module 331, using power level information 356, in some embodiments, controls the transmitter module 304 to transmit an availability indicator signal, in some but not necessarily all embodiments, at a power level that is different than the power level used for transmitting traffic data. The availability signal may be transmitted at an average power level than that used for traffic data to increase the chances of detection.

Decision module 336 is for deciding, based on the indication of link quality and the generated estimate of link quality whether to send a signal to at least one of the first and second nodes 102, 104. The decision module 336 uses, recovered indicated traffic data rate 350, indicated link quality information 354 and the generated estimate of link quality 362 to decide if a signal should be sent to at least one of the first and second nodes 102, 104. This may be done in accordance with one or more of the exemplary method presented in this application. The recovered indicated traffic data 348 and/or the indicated link quality information 354 provides an indication of the link quality corresponding to a link between the first and second nodes. The generated estimate of link quality 362 gives an estimate of link quality corresponding to a communication link between the first and third node 102, 106. In some embodiments, the decision module 336 includes a link quality comparison module 341 which compares the indication of link quality (e.g., from recovered indicated traffic data rate 350 or indicated link quality information 354) and the generated estimate of link quality 362 to decide whether to send a signal to at least one of the first and second nodes 102, 104. In some embodiments, indicated link quality may be, e.g., an SNR level, an SIR level, channel path gain etc. The recovered indicated traffic data rate 350 is an output of the recovery module 324. The indicated link quality information 354 is an output of the indicated link quality recovery module 326, while the estimated link quality information 362 is an output of the link quality estimate generation module 328. In some embodiments, the decision module 336 may decide to send a signal to one of the first and second nodes 102, 104 when the estimated link quality indicates a link quality between the first and third nodes 102, 106, which is at least twice as good as the quality of a link between the first and second nodes 102, 104 as indicated by the indication of link quality.

Availability indicator signal generation module 334, generates an availability indicator signal to be sent to at least one of the first and second nodes 102, 104 when it is decided by the decision module 336 to send a signal at least one of the first and second nodes 102, 104. The generated availability indicator signal 348 is an output of the generation module 334 and is transmitted by the transmitter module 304 to at least one of the first and second nodes 102, 104 in accordance with the decision made by the decision module 336.

Decoder module 337 is for performing a decoding operation on a first traffic signal received by the third node, to recover the traffic data being communicated from the first node 102 to the second node 104. As discussed earlier, in some embodiments, the third node 106 receives a first traffic signal from the first node 102 communicating traffic data to the second node 104. In some embodiments, the third node 106 performs a data decoding operation on the received first traffic signal using the decoder module 337. While recovering the traffic data the decoder module 337, in some embodiments, performs as part of the decoding, an error correction decoding operation. Thus errors in the received data may be corrected as part of the process in order to recover the original traffic data from the first traffic signal. As should be appreciated, it may be possible that the third node 106 received erroneous traffic data including errors from the first node 102 due to, e.g., channel interference, noise level etc. Thus in such cases, the decoder module 337 successfully recovers the original traffic data packets included in the first traffic signal.

Encoder module 338 is used by the third node 106 for performing a data encoding operation to generate an encoded version of the recovered communicated traffic data. For example, after recovering the traffic data included in the received first traffic signal, it may be desired that the recovered traffic data be encoded prior to being transmitted by the third node 106 to the second node 104. The encoder module 338 receives the recovered traffic data from the decoder module 337 and performs an encoding operation in order to obtain an encoded version of the recovered traffic data. Following this, a second traffic signal generation module 340 generates a second traffic signal including the encoded version of the recovered traffic data. The second traffic signal is then communicated by the third node 106 to the second node 104 thus communicating, through the third node 106, the original traffic data directed to the second node 104 from the first node 102 as a result of decoding and re-encoding transmission errors are corrected and not simply propagated as can be the case if the third device acted as a simple repeater which it can and sometimes does do.

Monitored wireless communications signals (342, 344) represent signals which are received by wireless receiver module 302 and processed by the peer discovery module 339. List of identified peer communications devices in vicinity 346 is a list of devices/peer nodes that is maintained and updated by the peer discovery module 339 which identifies devices with which communications node 300 can seek to establish communications.

The list 346 may include, e.g., the first and second nodes 102, 104 once they have been identified by the third node 106 to be in the vicinity. Generated availability indicator signal 348 is an output of the availability indicator signal generation module 334, and may be transmitted by wireless transmitter module 304 when desired by the third node 300 as will be discussed below.

Power level information 356 includes information used by transmission power control module 331 to control the wireless transmitter module 304 to transmit different types of signals, e.g., availability indicator signal level info 360. The power level information 356 also includes power level information corresponding to received wireless signals by the third node 300 from, e.g., the first and/or second nodes 102, 104. For example, in some embodiments, the power level information 356 includes received signal level info 358 which is the power level information for wireless communications received by the third node from the first node. The received signal level info 358 is an output of the power measurement module 330.

Figure 4:
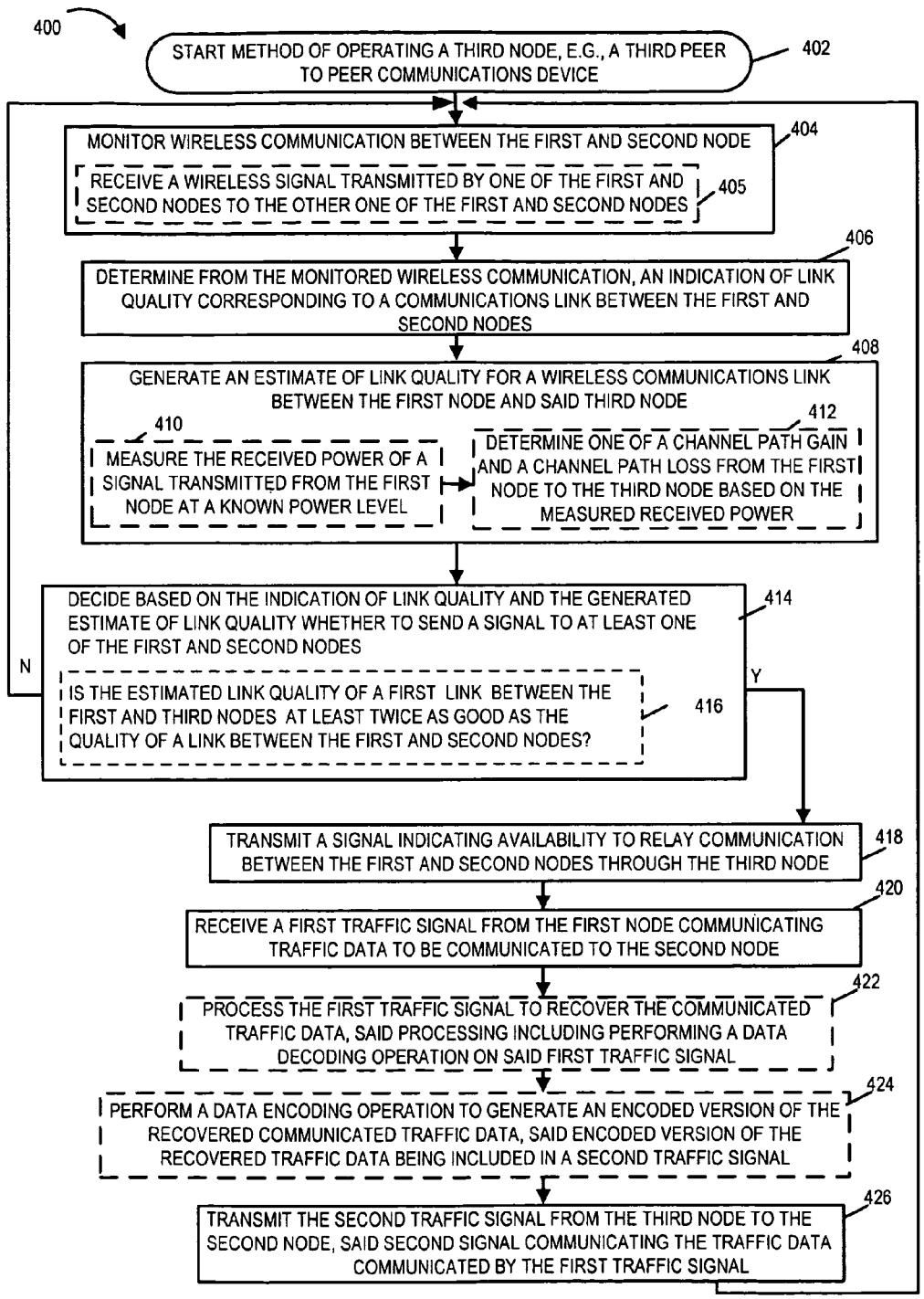
FIG. 4 is a flowchart of an exemplary method of operating a third node, e.g., a first peer to peer communications device, to communicate with a second peer to peer communications device.

FIG. 4 is flowchart 400 of an exemplary method of operating a third node, e.g., node 106, to facilitate communication between a first node, e.g., the first peer to peer communications node 102, and a second node, e.g., the second peer to peer communications node 104. For the purpose of this example, the first and second communications nodes 102, 104 are in the range of third node 106 which acts as an intermediary device to facilitate communications between communication nodes 102, 104. Operation of the exemplary method starts in step 402 where the third node is powered on and initialized. Operation proceeds from start step 402 to step 404.

In step 404 the third node 106 monitors for the presence of any wireless communication going on between nodes in the region, e.g., the first and second nodes 102, 104. In some embodiments, during monitoring, the third node 106 may, and sometimes does, receive a wireless signal, e.g., a traffic data rate indicator signal 204, a link quality indicator signal 206 etc., in sub-step 405. The signal received in sub-step 405 was transmitted by one of the first and second nodes 102, 104 to the other one of the first and second nodes 102, 104. In some embodiments, the monitored wireless communication between the first and second nodes 102, 104 is a traffic data rate indicator signal, e.g., signal 204 as discussed in the example of FIG. 2 and which is also sometimes referred to as the rate echo signal, communicated from the second node 104 to the first node 102. In some embodiments, the monitored wireless communication between the first and second nodes 102, 104 is a link quality indicator signal, e.g., signal 206 as discussed in the example of FIG. 2, communicated from the second node 104 to the first node 102. The operation proceeds from step 404 which includes sub-step 405 to step 406.

In step 406, the third node determines from the monitored wireless communications, e.g., from a received wireless signal, an indication of link quality corresponding to a communications link between the first and second nodes 102, 104. Recall the example of FIG. 2 where we discussed that the third node 106 determines an indication of the link quality of the communication link, e.g., the first communication link 208 of FIG. 2, between the first and second node 102, 104. In some embodiments, the step 406 of determining from the monitored wireless communication an indication of link quality corresponding to a communications link between the first and second nodes 102, 104 includes recovering an indicated traffic data rate from a received traffic data rate indicator signal and using the data rate or value generated therefrom as a link quality indicator. In some other embodiments, where a link quality indicator signal is received as a part of the monitoring, determining step 406 includes recovering an indicated link quality from the received link quality indicator signal and using the recovered value or a value derived therefrom as a link quality indicator. In some such embodiments the third node 106 includes required means for recovering an indicated link quality from the link quality indicator signal, e.g., a link quality recovery module 326, which recovers the indicated link quality value from the monitored wireless communications. In some embodiments the recovered link quality may be, e.g., a value indicating an SNR level, a SIR level, a channel path gain, a channel path loss, an interference level or some other quality indicator. The operation proceeds from step 406 to step 408.

In step 408, the third node 106 generates an estimate of link quality for a wireless communication link between the first node 102 and the third node 106, e.g., second communication link 210 of FIG. 2. In some embodiments, during the step of generating an estimate, the third node 106 may, and sometimes does, perform sub-step 410 and 412. In sub-step 410 the third node measures the received power of a signal transmitted from the first node 102 at a known power level. For example, while monitoring for wireless communication between the first and second nodes 102, 104, the third node 106 may detect a signal, e.g., a broadcast discovery signal, pilot signal etc., transmitted from the first node 102 to the second node 104. The third node 106, using the power measurement module 330 may measure the power of the received signal. Following the measurement of the received power, in sub-step 412 the third node 106 determines one of a channel path gain and a channel path loss corresponding to, e.g., a communication link/channel between the first node 102 and the third node 106, based on the measured received power.

The operation proceeds from step 408 to step 414 wherein the third node 106 decides based on the indication of link quality (e.g., as determined in step 406) and the generated estimate of link quality (e.g., as generated in step 408), whether or not to send a signal to at least one of the first and second nodes 102, 104. The decision whether or not to send a signal is based on one or more decision rules and/or thresholds used by the third node 106 in order to make such a decision. One exemplary decision process is shown in exemplary sub-step 416. Thus, in some embodiments, the decision is a based on whether a set of conditions is satisfied. In some embodiments, such a set of conditions include, e.g., CONDITION 1: whether the estimated link quality indicates a first link quality between the first and the third node (e.g., as generated in step 408) is at least twice as good as the quality of a link between the first and second nodes as indicated by the indication of link quality (e.g., as determined in step 406). This may be determined by comparing link quality values. It should be appreciated that a single condition is being discussed here as an example. However the decision process may, and sometimes is, based on whether or not multiple conditions are satisfied. The operation proceeds from step 414, which includes sub-step 416, to step 418 if the decision is to transmit a signal to one of the first and second nodes 102, 104. Otherwise the operation proceeds from step 416 back to step 404.

In step 418, the third node 106 transmits a signal, e.g., signal 214 or 216 shown in FIG. 2, indicating availability to relay communication between the first and second nodes 102, 104 through the third node 106. In some embodiments, such a signal indicating availability to relay communication is an instruction to perform communication through the third node 106. For example, in some embodiments, the system design provides the control to the third node 106 to make a decision to relay the communication between the first and second nodes 102, 104 through the third node 106 provided the link quality conditions are satisfied. In such embodiments, the authority to instruct the first and/or the second node 102, 104 to communicate through the third node 106 lies with the third node and an instruction from the third node 106, in some embodiments, is binding on the first and second nodes 102, 104. In some other embodiments, a signal indicating availability of the third node 106 to relay communication between the first and second nodes 102, 104, is simply an indication that the third node 106 is available as a relay, for selection by one of the first and second nodes 102, 104. For example, in some embodiments, the signal indicating availability is, e.g., a routing information signal identifying that the third node 106 can route traffic signals from the first node 102 to the second node 104. In some such embodiments, the third node 106 may provide the link quality comparison data to at least one of the first and second nodes 102, 104, to help the first and/or second nodes 102, 104 to make a decision whether or not to use the third node 106 as a hop-point. In some such embodiments, one of the first and second nodes 102, 104 has the ability to make a decision and control whether the third node 106 is used as a relay in communicating data to the other one of the first and second nodes 102, 104. The operation proceeds from step 418 to step 420.

In step 420, following the transmission of the signal indicating availability of the third node 106, and assuming that the at least one of the first and second nodes 102, 104 positively responds to the transmitted signal (either by their own choice or in response to an instruction from the third node), the third node 106 receives a first traffic signal from the first node 102 communicating traffic data to be communicated to the second node 104. In various embodiments, the traffic data includes user data. The user data may be, for example, data corresponding to voice, image, text and/or user application. Since the third node 106 is acting at this point in the process, as a hop-point in routing the traffic data from the first node 102 to the second node 104, the third node 106 receives the traffic data directed to the second node 104 from the first node 102. In some embodiments, further processing may be desired and/or required on the first traffic signal received by the third node 106 communicating traffic data. For example in some embodiments it is desirable to change, e.g., the coding format, of the traffic data being communicated in the traffic signal received by the third node 106 in order to make it more suitable for transmission via the third node 106 to the second node 104 and/or to correct errors in the received communications. Thus, in some such embodiments, the operation proceeds from step 420 to step 422. Alternatively, in some embodiments no further processing is desired and/or required to be performed on the traffic signal received by the third node 106 and in such embodiments, the operation proceeds directly from step 420 to step 426.

In optional step 422, the third node processes the first traffic signal to recover the communicated traffic data. The third node 106 uses a decoder module 337 which performs recovers the traffic data from the first traffic signal. For example, in some embodiments the decoder module 337 performs an error correcting decoding operation on the received traffic signal. Operation proceeds from step 422 to step 424 wherein the third node 106 performs a data encoding operation to generate an encoded version of the recovered communicated traffic data. In some embodiments the encoded version of the traffic data may have a different encoding format from the encoding format of the received communicated traffic data. After encoding the recovered traffic data, the third node 106 generates, as part of step 424, a second traffic signal including the encoded version of the recovered traffic data. Operation proceeds from step 424 to step 426.

In step 426, the third node 106 transmits the second traffic signal to the second node 104. The second traffic signal communicating the traffic data communicated by the first traffic signal, e.g., the traffic data directed from the first node 102 to the second node 104.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a third node to facilitate communication between a first and second node, the method comprising:

monitoring wireless communication between the first and second node and receiving a wireless signal transmitted by one of the first and second nodes to the other one of the first and second nodes;

determining from the monitored wireless communication, an indication of link quality corresponding to a communications link between the first and second nodes;

generating an estimate of link quality for a wireless communications link between the first node and said third node;

deciding based on the indication of link quality and the generated estimate of link quality whether to send a signal to at least one of the first and second nodes and transmitting, when it is decided to send a signal to at least one of the first and second nodes, a signal indicating availability to relay communications between the first and second nodes through the third node.

2. The method of claim 1, wherein said signal indicating availability to relay communication is an instruction to perform communication through the third node.

3. The method of claim 1, wherein said signal indicating availability to relay communication indicates that the third node is available for selection by one of said first and second nodes as a relay.

4. The method of claim 3, further comprising:

receiving a first traffic signal from the first node communicating traffic data to be communicated to the second node; and transmitting a second traffic signal from the third node to the second node, said second signal communicating the traffic data communicated by the first traffic signal.

5. The method of claim 4, further comprising:
processing the first traffic signal to recover the communicated traffic data, said processing including performing a data decoding operation on said first traffic signal; and
performing a data encoding operation to generate an encoded version of the recovered communicated traffic data, said encoded version of the recovered traffic data being communicated by said second traffic signal.

6. The method of claim 1, wherein said first and second nodes are mobile wireless terminals and said third node is a stationary device.

7. The method of claim 1,
wherein the monitored wireless communication between the first and second node is a traffic data rate indicator signal communicated from the second node to the first node; and
wherein determining from the monitored wireless communication an indication of link quality corresponding to a communications link between the first and second nodes includes recovering an indicated traffic data rate from the traffic data rate indicator signal.

8. The method of claim 1,
wherein the monitored wireless communication between the first and second node is a link quality indicator signal communicated from the second node to the first node; and
wherein determining from the monitored wireless communication an indication of link quality corresponding to a communications link between the first and second nodes includes recovering an indicated link quality from the link quality indicator signal.

9. The method of claim 1, wherein generating an estimate of link quality for a wireless communications link between the first node and said third node includes:
measuring the received power of a signal transmitted from the first node at a known power level; and
determining one of a channel path gain and a channel path loss from the first node to the third node based on the measured received power.

10. The method of claim 1, wherein deciding based on the indication of link quality and the generated estimate of link quality whether to send a signal to at least one of the first and second nodes includes:
deciding to send said signal when the estimated link quality indicates a first link quality between the first and third nodes which is at least twice as good as the quality of a link between the first and second nodes as indicated by the indication of link quality.

11. The method of claim 1, wherein deciding based on the indication of link quality and the generated estimate of link quality whether to send a signal to at least one of the first and second nodes includes:
deciding not to send said signal when the estimated link quality indicates a first link quality between the first and third nodes which is less than at least twice as good as the quality of a link between the first and second nodes as indicated by the indication of link quality.

12. A communications node, comprising:
a monitoring module configured to monitor wireless communication between a first node and a second node;
a link quality indication determination module configured to determine from the monitored wireless communication, an indication of link quality corresponding to a communications link between the first and second nodes;
a link quality estimate generation module configured to generate an estimate of link quality for a wireless communications link between the first node and said communications node; and
a decision module configured to decide based on the indication of link quality and the generated estimate of link quality whether to send a signal to at least one of the first and second nodes
a receiver for receiving a wireless communication between the first and second nodes, said wireless communication including a wireless signal transmitted by one of the first and second nodes to the other one of the first and second nodes; and
a transmitter configured to transmit a signal indicating availability to relay communications between the first and second nodes through the communications node when it is decided by said decision module to send a signal to at least one of the first and second nodes.

13. The communications node of claim 12, wherein said signal indicating availability to relay communication is an instruction to perform communication through the communications node.

14. The communications node of claim 12, wherein said signal indicating availability to relay communication indicates that the communications node is available for selection by one of said first and second nodes as a relay.

15. The communications node of claim 14,
wherein said receiver is further configured to receive a first traffic signal from the first node communicating traffic data to be communicated to the second node; and
wherein said transmitter is further configured to transmit a second traffic signal from the communications node to the second node, said second signal communicating the traffic data communicated by the first traffic signal.

16. The communications node of claim 15, further comprising:
a decoder module configured to perform a decoding operation on the first traffic signal to recover said traffic data; and
an encoder module configured to perform a data encoding operation to generate an encoded version of the recovered communicated traffic data, said encoded version of the recovered traffic data being communicated by said second traffic signal.

17. The communications node of claim 12,
wherein said communications node is a stationary device; and
wherein said first and second nodes are mobile wireless terminals.

18. The communications node of claim 12,
wherein the monitored wireless communication between the first and second node is a traffic data rate indicator signal communicated from the second node to the first node; and
wherein said link quality indication determination module includes a traffic data rate recovery module for recovering an indicated traffic data rate from the traffic data rate indicator signal.

19. The communications node of claim 12,
wherein the monitored wireless communication between the first and second node is a link quality indicator signal communicated from the second node to the first node; and wherein said link quality indication determination module includes an indicated link quality recovery module for recovering an indicated link quality from the link quality indicator signal.

20. The communications node of claim 12, wherein the link quality estimate generation module includes:
   a power measurement module for measuring the received power of a signal transmitted from the first node at a known power level; and
   a determination module configured to determine one of a channel path gain and a channel path loss from the first node to the communications node based on the measured received power.

21. A communications node, comprising:
   monitoring means for monitoring wireless communication between a first node and a second node;
   link quality indication determination means for determining from the monitored wireless communication, an indication of link quality corresponding to a communications link between the first and second nodes;
   link quality estimate generation means for generating an estimate of link quality for a wireless communications link between the first node and said communications node;
   decision means for deciding, based on the indication of link quality and the generated estimate of link quality, whether to send a signal to at least one of the first and second nodes; and
   receiver means for receiving a wireless communication between the first and second nodes, said wireless communication including a wireless signal transmitted by one of the first and second nodes to the other one of the first and second nodes
   transmitter means for transmitting a signal indicating availability to relay communications between the first and second nodes through the communications node when it is decided by said decision means to send a signal to at least one of the first and second nodes.

22. A computer program product for use in a communications node, comprising:
   computer readable medium comprising:
      code for causing a computer to monitor wireless communication between a first node and a second node;
      code for causing a computer to determine from the monitored wireless communication, an indication of link quality corresponding to a communications link between the first and second nodes;
      code for causing a computer to generate an estimate of link quality for a wireless communications link between the first node and said communications node; and
      code for causing a computer to decide based on the indication of link quality and the generated estimate of link quality whether to send a signal to at least one of the first and second nodes;
      code for causing a computer to receive a wireless communication between the first and second nodes, said wireless communication including a wireless signal transmitted by one of the first and second nodes to the other one of the first and second nodes; and
   code for causing a computer to transmit a signal indicating availability to relay communications between the first and second nodes through the communications node when it is decided to send a signal to at least one of the first and second nodes.

\* \* \* \* \*